(12) United States Patent
Oezkan et al.

(10) Patent No.: US 11,365,768 B2
(45) Date of Patent: Jun. 21, 2022

(54) END DISK OF A MULTI-DISK CLUTCH, ASSEMBLY, AND METHOD OF MANUFACTURING AN ASSEMBLY

(71) Applicant: Hoerbiger Antriebstechnik Holding GmbH, Schongau (DE)

(72) Inventors: Sami Oezkan, Schongau (DE); Christopher Traut, Schongau (DE)

(73) Assignee: HOERBIGER ANTRIEBSTECHNIK HOLDING GMBH, Schongau (DE)

( * ) Notice: Subject to any disclaimer, the term of this patent is extended or adjusted under 35 U.S.C. 154(b) by 0 days.

(21) Appl. No.: 16/906,176

(22) Filed: Jun. 19, 2020

(65) Prior Publication Data

US 2020/0400201 A1     Dec. 24, 2020

(30) Foreign Application Priority Data

Jun. 19, 2019   (DE) .......................... 102019116682.9

(51) Int. Cl.
| | |
|---|---|
| *F16D 13/64* | (2006.01) |
| *F16D 13/52* | (2006.01) |
| *F16D 13/75* | (2006.01) |
| *F16D 13/70* | (2006.01) |

(52) U.S. Cl.
CPC ........... *F16D 13/648* (2013.01); *F16D 13/52* (2013.01); *F16D 13/70* (2013.01); *F16D 13/75* (2013.01); *F16D 2250/0023* (2013.01); *F16D 2300/12* (2013.01)

(58) Field of Classification Search
CPC .... F16D 13/52; F16D 13/64–70; F16D 13/75; F16D 2250/0023; F16D 2300/10; F16D 2300/12

USPC ....... 192/70.19, 70.13, 70.14, 107 R, 109 R, 192/110 R

See application file for complete search history.

(56) References Cited

U.S. PATENT DOCUMENTS

| | | | | |
|---|---|---|---|---|
| 6,311,815 | B1 * | 11/2001 | Riggle .................. | F16D 13/648 192/70.14 |
| 7,063,197 | B2 * | 6/2006 | Merkel ................... | F16D 65/12 192/85.24 |
| 8,657,088 | B2 * | 2/2014 | Yamashita ............ | F16D 13/648 192/3.29 |
| 8,714,331 | B2 * | 5/2014 | Miyazaki ................ | F16D 13/54 192/85.46 |
| 9,765,829 | B2 * | 9/2017 | Carr ........................ | F16C 35/06 |
| 10,955,009 | B2 * | 3/2021 | Francis ................. | F16D 13/648 |
| 2008/0217133 | A1 * | 9/2008 | Ikeda ...................... | F16D 13/70 192/70.11 |
| 2014/0182995 | A1 * | 7/2014 | Ando ...................... | F16D 69/00 192/107 R |

FOREIGN PATENT DOCUMENTS

JP        2018179029 A   * 11/2018   ........... F16D 13/648

* cited by examiner

*Primary Examiner* — Richard M Lorence
(74) *Attorney, Agent, or Firm* — McNees Wallace & Nurick LLC

(57) ABSTRACT

An end disk of a multi-disk clutch is described, which has a ring plate, the ring plate having a central opening and at least one axial impression on a front side via which a corresponding projection is formed on the opposite front side.

6 Claims, 3 Drawing Sheets

CONVENTIONAL ART
CONVENTIONAL ART
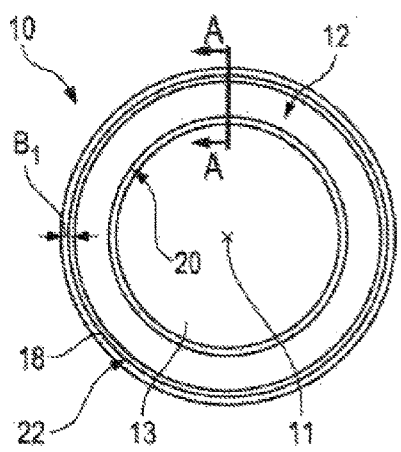
Fig. 1A
Fig. 1B
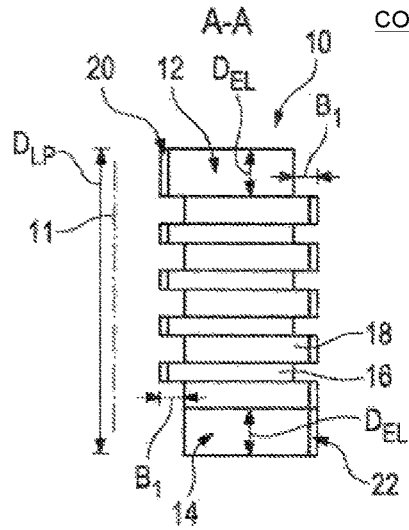
Fig. 2A
Fig. 2B

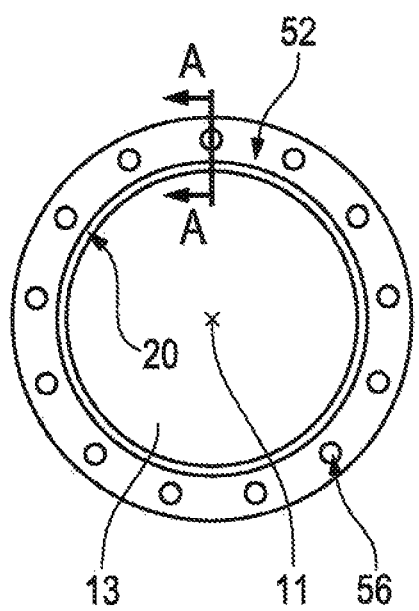
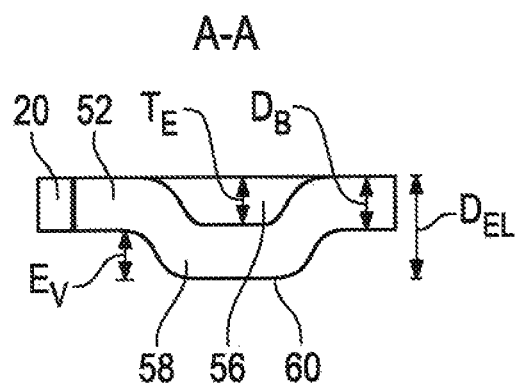
Fig. 3A
Fig. 3B
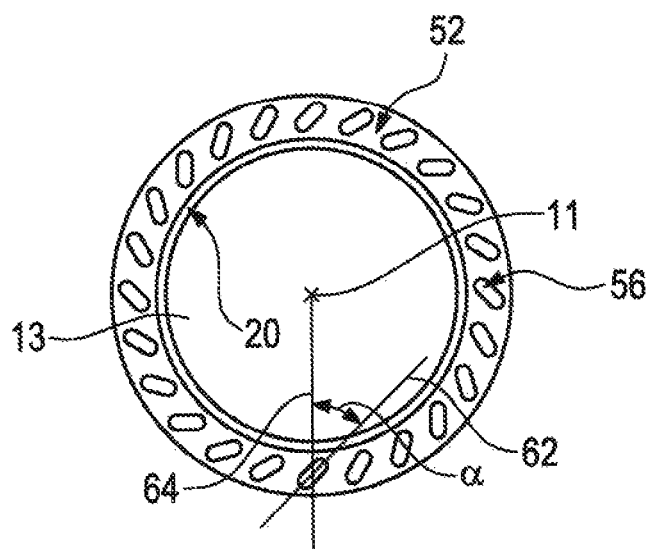
Fig. 4

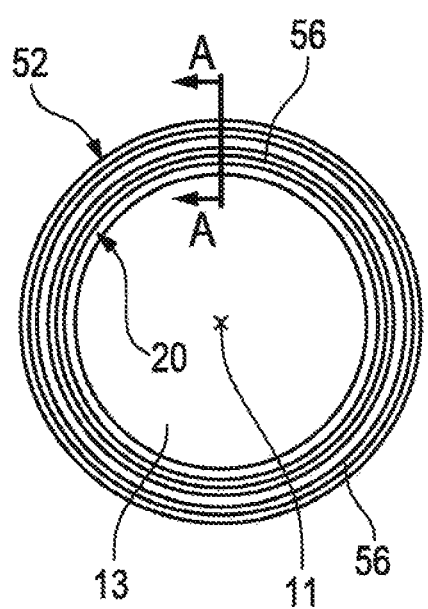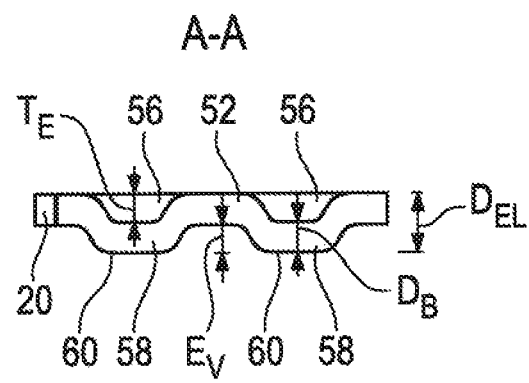
Fig. 5A
Fig. 5B

100
END DISK OF A MULTI-DISK CLUTCH, ASSEMBLY, AND METHOD OF MANUFACTURING AN ASSEMBLY

FIELD OF THE INVENTION

The invention relates to an end disk of a multi-disk clutch and to an assembly of a plurality of end disks, and to a method of manufacturing the assembly.

BACKGROUND

Disk packs, multi-disk clutches, which also include multi-disk brakes, are widely used in the prior art. They are used when rotating parts are to be selectively connected to each other in a torque-transmitting manner or separated from each other without torque. The torque is transmitted by frictional engagement.

As a rule, reference is made to a clutch if both parts to be connected are rotatable. Usually, reference is made to a brake if one of the parts is rotatable and the other is stationary, wherein for the sake of simplicity, the generic term "clutch" is also intended to comprise a brake below.

Multi-disk clutches having disk packs are used in particular in the field of vehicle transmissions which are adapted to be shifted in an automated manner. Here, the fact is exploited that such clutches can transmit or hold high torques relative to the installation space required.

Such disk packs usually have one end disk and a disk carrier base or two end disks between which a plurality of intermediate disks is arranged. The intermediate disks are, for example, steel or friction disks, which each have a specific thickness tolerance. For disk packs including a large number of intermediate disks, this results in a wide spreading of disk pack lengths.

To maintain the maximum tolerance, tolerance compensation is often carried out using the end disks. The end disks are available in various thicknesses and are selected such that the disk pack length is as close as possible to the nominal dimension. Usually a number of five to ten different thicknesses is required.

Alternatively, the end disks are either ground down from a uniform disk thickness to different disk thicknesses, or disks of different disk thicknesses are available from which the end disks are manufactured.

These variants cause high costs, such as process costs, storage, handling, set-up times or similar.

The object of the invention is to provide a reliable and precise end disk which can be manufactured easily and cost-effectively.

SUMMARY

The present invention provides an end disk of a multi-disk clutch, which has a ring plate having a center opening and at least one axial impression on one front side, a corresponding projection being formed via the axial impression on the opposite front side.

By varying the depth of the impressions and of the corresponding projections, a variable thickness of the end disk can be realized always on the basis of the same sheet metal wall thickness. In addition, the number and positions of the impressions and of the corresponding projections can be adapted to the respective case of application. A further advantage is that all variants of an end disk can be represented with a ring plate blank without having to carry out an additional finishing.

The end disk can have a multi-tooth profile on the radially inner or on the radially outer peripheral edge (inner or outer disk).

Optionally, the end disk can have a friction lining, in particular on the at least one projection.

Depending on the demands on the end disk, the axial depth, shape and number of impressions and, correspondingly, the axial extension, shape and number of the associated projection can vary from end disk to end disk and can be worked individually into the ring plate.

In one embodiment, it is thus possible for an impression and an associated projection to extend annularly around the opening, in particular centrically to the central axis of the end disk. In this way, a contact surface of the ring plate formed by an axial front side of the projection can be enlarged, and thus the forces acting on the projections can be better distributed on the ring plate and vice versa.

Alternatively, several of radially spaced, circumferential, annular impressions and associated projections are provided, which are in particular concentric with each other. This allows the contact surface of the ring plate to be increased even further.

A further embodiment provides that a plurality of circumferentially spaced apart impressions and corresponding projections are provided.

In particular, the centers of all impressions are arranged on the same annularly circumferential periphery which is centric to the central axis of the end disk.

Alternatively, the centers of at least circumferentially adjacent impressions can be positioned radially offset with respect to each other.

Optionally, the circumferential distance between the centers of respectively adjacent impressions can vary.

According to one aspect, the impressions and the projections associated therewith form circular or oval surfaces.

This makes it possible to adapt the end disk individually to a wide range of cases of application.

In particular, the oval surfaces have their respective longitudinal central axis oriented obliquely to a radially extending straight line intersecting the longitudinal central axis. In this way, a contact surface of the ring plate formed by an axial front side of the projections can be enlarged.

In other words, an angle between the respective longitudinal central axis of the oval surfaces and the intersecting radially extending straight lines is greater than 0° and less than 90°.

The angle is in particular between 30° and 45°.

Optionally, the angle is (essentially) identical for all oval surfaces.

Alternatively, the angle of at least one oval surface is different.

A further aspect provides that all projections define a plane outer surface that is located in a common radial plane to the central axis of the end disk. Forces can therefore be transferred uniformly from the end disk to a further component via the projections, or vice versa.

The radial plane is parallel to a cross-sectional plane of the ring plate.

In other words, the radial plane is always perpendicular to the central axis of the end disk.

It is in particular possible to provide various forms of impressions and associated projections on the ring plate.

Furthermore, the object is achieved by an assembly of a plurality of end disks, the end disks being made of sheet metal and each having the same sheet metal wall thickness, the axial extension of the projections being different when comparing the end disks with each other. This results in a modular system from which the correct end disks can be selected individually and depending on the disk pack thickness, in order to obtain the desired clutch dimensions.

The end disks thus have a sheet metal wall thickness and a disk thickness induced by the axial extension of the projections, which is composed of the sheet metal wall thickness and the axial extension of the projections.

Therefore, the end disks have different disk thicknesses among each other, only in that the axial extension of the projections is different when comparing the end disks with each other.

In particular, the end disks have identical geometries except for the different axial extension of the projections and the corresponding different axial depth of the impressions. This reduces the manufacturing effort, as the corresponding manufacturing tools do not have to be adjusted to different end disk geometries. In addition, the storage effort can be reduced, since no prefabricated ring plate blanks having different geometries have to be stored.

Furthermore, the object is achieved by a method of manufacturing an assembly, comprising the following steps:

providing ring plates made of sheet metal, which all have the same sheet metal wall thickness and the same external dimensions, and manufacturing end disks differing in their axial disk thickness by producing impressions of different depths and thus projections which differ in their axial extension by means of a forming tool, in particular always by means of the same forming tool which penetrates the end disks at different depths.

In particular, an internal or external toothing may already be provided on the radially inner or radially outer circumferential edge of the ring plate prior to the manufacturing step of providing ring plates. In other words, the ring plate blanks have an internal or external toothing.

Optionally, the manufacture of internally or externally toothed ring plates can be provided before or after the manufacture of end disks differing in their axial disk thickness.

By manufacturing individually adapted axial depths of the impressions and thus individually adapted axial extensions of the projections per end disk, a subsequent grinding work is reduced or a grinding work is completely omitted.

The described advantages and properties of the end disk according to the invention apply equally to the assembly and the method of manufacturing an assembly and vice versa.

BRIEF DESCRIPTION OF THE DRAWINGS

FIG. 1A shows a top view of a disk pack according to the prior art,

FIG. 1B shows a cross-section of the disk pack according to the prior art,

FIG. 2A shows a top view of a disk pack according to the invention,

FIG. 2B shows a cross-section of the disk pack according to the invention,

FIG. 3A shows a top view of a first embodiment of an end disk according to the invention, FIG. 3B shows a cross-section of the first embodiment of the end disk according to the invention, FIG. 4 shows a top view of a second embodiment of the end disk according to the invention, FIG. 5A shows a top view of a third embodiment of the end disk according to the invention, and FIG. 5B shows a cross-section of the third embodiment of the end disk according to the invention.

DETAILED DESCRIPTION

FIG. 1 shows a disk pack 10 according to the prior art. Here, the disk pack is shown in a compressed state.

The disk pack 10 comprises a plurality of disks 12, 14, 16, 18, which are each configured as a ring plate and alternately have an internal toothing 20 or an external toothing 22. Disk carriers are omitted for simplification.

The various ring plates are arranged axially, i.e. in a direction parallel to a central axis 11, one behind the other and each have an opening 13.

The two outermost disks 12, 14 are referred to as end disks 12, 14 and have different toothings 20, 22.

One of the two end disks 12, 14 can also be configured as a disk carrier base, in particular as a flat disk carrier base, so that the disk pack 10 only comprises one end disk 12, 14.

The two end disks 12, 14 can be made of the same material, such as sheet metal, or of different materials.

The internally toothed end disk 12 has a plurality of internally toothed intermediate disks 16, and the externally toothed end disk 14 has a plurality of externally toothed intermediate disks 18.

The intermediate disks 16, 18 are provided between the end disks 12, 14 and can, for example, be configured as steel disks coated with friction material. Intermediate disks having an identical toothing 20, 22 are made of the same material. The disks 16 form a disk group just like the disks 18.

The disks 16 of one disk group are radially offset by $B_1$ with respect to the disks 18 of the other disk group.

In the axial direction, the disks 16 of one disk group are each arranged between two disks 18 of the other disk group.

In the embodiment considered here, only the end disk 14 is positioned directly adjacent to the next associated intermediate disk 18.

The disk pack 10 must have a predetermined total thickness $D_{LP}$. This total thickness $D_{LP}$ can vary from disk pack 10 to disk pack 10.

To compensate for tolerances of the individual intermediate disks 16, 18 and to maintain the predetermined total thickness $D_{LP}$, the end disks 12, 14 of usual disk packs 10, as in FIG. 1, are each ground to a specific disk thickness $D_{EL}$.

Alternatively, end disks 12, 14 having specific pre-fabricated disk thicknesses $D_{EL}$ are inserted into the disk pack 10.

In order to reduce the manufacturing and storage costs of such end disks 12, 14, end disks 52, 54 according to FIG. 2 are inserted in a disk pack 50.

Here too, one of the two end disks 52, 54 can be configured as a disk carrier base, in particular as a flat disk carrier base, so that the disk pack 50 only comprises one end disk 52, 54. However, the two end disks 12, 14 shown in FIG. 2 should show that the special end disk explained below can be an inner end disk or an outer end disk.

FIG. 2 shows the disk pack 50 in a compressed state. The same reference numbers are used for the features known from FIG. 1, and in this respect, reference is made to the above explanations.

In contrast to the disk pack 10 in FIG. 1, the end disks 52, 54 of the disk pack 50 each have impressions 56 on their outer side facing away from the intermediate disks 16, 18, which each form a projection 58 on the inner side facing towards the intermediate disks 16, 18.

Only the circularly configured projections 58 each have a front-side contact surface 60 in contact with one of the intermediate disks 16, 18 in the compressed state of the disk packet 50.

The impressions 56 and associated projections 58 can be worked into the end disk 52, 54 using a forming tool. These can have various shapes. Depending on the required disk thickness $D_EL$ or the total thickness $D_{LP}$, end disks 52, 54 with a required axial depth $T_E$ of the impressions 56 and a corresponding axial extension $E_V$ of the projections 58 are used.

In FIG. 1, the disk thickness $D_{EL}$ corresponds to the sheet metal wall thickness $D_B$ of the end disks 12, 14. In the embodiment according to FIG. 2, the disk thickness $D_{EL}$ corresponds to the sheet metal wall thickness $D_B$ plus the depth $T_E$ or axial extension $E_V$ of the impressions 56 or the projections 58, respectively.

Various embodiments of end disks 52 having differently shaped impressions 56 and projections 58 are described below.

FIG. 3 shows the first embodiment of the end disk 52 according to FIG. 2 in a top view and in cross-section. FIG. 3 b) shows the impression 56 and the associated projection 58 in detail.

The circular impressions 56 and the associated circular projections 58 are inserted so as to be centered circumferentially in the end disk 52. This means that all impressions 56 and associated projections 58 have (essentially) the same distance from the central axis 11.

The circumferential distance between respectively adjacent impressions 56 and projections 58 is identical in this embodiment.

A second embodiment of the end disk 52 is shown in FIG. 4.

In this embodiment, the impressions 56 and the associated projections 58 have an oval shape.

The oval surfaces each have an oblique longitudinal central axis 62, which is oriented obliquely to a respective radially extending straight line 64 intersecting the longitudinal central axis 62.

An angle α between the longitudinal central axis 62 and the straight line 64 defines an orientation of the oval impressions 56 and of the associated projections 58.

The angle is between 0° and 90°, preferably between 30° and 45°.

The cross-section of the second embodiment of the end disk 52 is similar to that of the first embodiment according to FIG. 3 b).

FIG. 5 shows a third embodiment of the end disk 52.

Here, the impressions 56 and the associated projections 58 run in a ring around the opening 13 of the end disk 52, in particular centrically to the central axis 11 of the end disk 52.

More specifically, the third embodiment has two radially spaced apart circumferential, annular impressions 56 and associated projections 58, which run concentrically with each other.

In all embodiments, the flat, front-side contact surfaces 60 of all projections 58 of an end disk 52, 54 define a flat outer surface P (e.g., FIGS. 2B, 3B, 5B), which are all located in a common radial plane to the central axis 11 of the end disk 52, 54.

The radial plane is always perpendicular to the central axis.

In a method of manufacturing the end disks 52, 54, sheet metal-like ring blanks are provided in a first step, which all have the same sheet metal wall thickness $D_B$ and the same external dimensions.

Optionally, these ring plate blanks can already have the internal or external toothing 20 or 22.

Alternatively, the internal or external toothing 20 or 22 can also be attached to the ring plate only in the following steps.

In a further step, the impressions 56 and the associated projections 58 are worked into the ring plate blank by means of a forming tool, in particular always by means of the same forming tool.

Here, different impressions 56 and associated projections 58 of a different depth $T_E$ or extension $E_V$ are produced in that the forming tool penetrates into the end disks 52, 54 at different depths. The end disk thickness $D_{EL}$ can thus be adjusted individually.

By manufacturing end disks 52, 54 having impressions 56 and axially projecting projections 58 of different depths and from identical sheets, an assembly in the form of a modular system is created which allows to associate the end disk 52, 54 having the optimum thickness with a disk pack.

The invention claimed is:

1. An end disk of a multi-disk clutch, comprising:
   a ring plate having a central opening and at least one axial impression on one front side, via which a corresponding projection is formed on the opposite front side,
   wherein the end disk has a multi-tooth profile on a radially inner peripheral edge or on a radially outer peripheral edge,
   wherein a plurality of radially spaced apart circumferential, annular impressions and associated projections run annularly around the central opening.

2. The end disk according to claim 1, wherein the impressions and the associated projections run centrically to central axis of the end disk.

3. The end disk according to claim 1, wherein the impressions are concentric with each other.

4. The end disk according to claim 1, wherein all of the projections define a plane outer surface arranged in a radial plane to a central axis of the end disk.

5. An assembly of a plurality of end disks of a multi-disk clutch, comprising:
   each end disk having a ring plate which has a central opening and at least one axial impression on one front side, via which a corresponding projection is formed on the opposite front side,
   wherein the plurality of end disks are made of sheet metal and each end disk has the same sheet metal wall thickness,
   wherein a respective axial extension of the projection is different when comparing the plurality of end disks with each other, and
   wherein the plurality of end disks has identical geometries except for the different axial extension of the projection and corresponding different axial depth of the impression.

6. A method of manufacturing an assembly of a plurality of end disks of a multi-disk clutch, each end disk having a ring plate which has a central opening and at least one axial impression on one front side, via which a corresponding projection is formed on the opposite front side, the plurality of end disks being made of sheet metal and each end disk has the same sheet metal wall thickness, a respective axial extension of the projections being different when comparing the plurality of end disks with each other, the method comprising:

providing ring plates of sheet metal, which all have same sheet metal wall thickness and same external dimensions, and manufacturing the plurality of end disks with different axial disk thickness by producing impressions of different depths and thus projections which differ in their axial extent by means of a forming tool which penetrates the plurality of end disks at different depths.

\* \* \* \* \*